United States Patent [19]

Takeuchi et al.

[11] Patent Number: 4,856,857
[45] Date of Patent: Aug. 15, 1989

[54] TRANSPARENT REFLECTION-TYPE

[75] Inventors: Satoshi Takeuchi, Kawasaki; Koutaro Danjo, Tokyo; Shigehiko Tahara, Tokyo; Yoshiharu Yui, Tokyo; Satoshi Ikeda, Tokyo, all of Japan

[73] Assignee: Dai Nippon Insatsu Kabushiki Kaisha, Tokyo, Japan

[21] Appl. No.: 249,194

[22] Filed: Sep. 26, 1988

Related U.S. Application Data

[63] Continuation of Ser. No. 857,640, Apr. 30, 1986, abandoned.

[30] Foreign Application Priority Data

May 7, 1985 [JP] Japan ................................. 60-96469
May 28, 1985 [JP] Japan ................................ 60-115067
Dec. 2, 1985 [JP] Japan ................................ 60-271174

[51] Int. Cl.⁴ .............................................. G03H 1/18
[52] U.S. Cl. ..................................... 350/3.6; 283/72; 283/86; 283/904; 350/3.61
[58] Field of Search .................. 283/86, 72, 101, 904; 350/3.6, 3.61; 428/40, 343

[56] References Cited

U.S. PATENT DOCUMENTS

| | | | |
|---|---|---|---|
| 3,552,853 | 1/1971 | Sanders et al. | 350/3.61 |
| 3,790,245 | 2/1974 | Hannan et al. | |
| 3,858,977 | 1/1975 | Baird et al. | |
| 3,869,301 | 3/1975 | Decker et al. | 350/3.61 |
| 3,887,742 | 6/1975 | Reinnagel | |
| 4,014,602 | 3/1977 | Ruell | 350/3.6 |
| 4,034,211 | 7/1977 | Horst et al. | |
| 4,269,473 | 5/1981 | Flothmann et al. | 283/86 |
| 4,330,604 | 5/1982 | Wreede et al. | 350/3.6 |
| 4,389,472 | 6/1983 | Neuhaus et al. | 283/72 |
| 4,419,436 | 12/1983 | Kranser | 428/40 |
| 4,501,439 | 2/1985 | Antes | 283/904 |
| 4,544,835 | 10/1985 | Drexler | 283/86 |
| 4,563,024 | 1/1986 | Blyth | 283/904 |
| 4,597,814 | 7/1986 | Colgate, Jr. | 283/904 |
| 4,631,222 | 12/1986 | Sander | 283/904 |

FOREIGN PATENT DOCUMENTS

| | | | |
|---|---|---|---|
| 3422908 | 1/1986 | Fed. Rep. of Germany | 283/72 |
| 631920 | 9/1982 | Switzerland | 283/72 |
| 2181993 | 5/1987 | United Kingdom | 283/101 |

*Primary Examiner*—Bruce Y. Arnold
*Assistant Examiner*—Martin Lerner
*Attorney, Agent, or Firm*—Arnold, White & Durkee

[57] ABSTRACT

A transparent-type hologram comprising a transparent hologram-forming layer and a holographic effect-enhancing layer comprising a thin transparent film, the holographic effect-enhancing layer being laminated on the hologram-forming portion of the transparent hologram-forming layer. The holographic effect-enhancing layer has a refractive index different from that of the transparent hologram-forming layer.

43 Claims, 4 Drawing Sheets

TRANSPARENT REFLECTION-TYPE

This is a continuation of application Ser. No. 06/857,640 filed Apr. 30, 1986, now abandoned.

BACKGROUND OF THE INVENTION

This invention relates to improvement of a hologram, and more particularly to a transparent-type hologram which is itself transparent and yet is also endowed with the characteristics of a reflection type hologram.

According to one method of recording a hologram, an interference fringe corresponding to the waveface of a light from a body of matter is recorded with an uneven pattern of the material surface, and the relief hologram obtained according to method has the advantage of performing a large amount of duplications easily by a press technique.

In these days, various attempts have been made to form relief holograms on substrates such as a credit card, cash card, book cover, record jacket, etc. When such a relief hologram is made integral with a substrate by the method such as transfer, plastering, direct formation, etc., the reflected light intensity becomes an important problem. Since a relief hologram is generally made of a synthetic resin, the reflected intensity at the relief forming surface, namely at the interface having a refractive index difference between the resin and air is small, and therefore the holographic effect is small.

For example, when a relief hologram is formed with a resin having a refractive index: $n=1.5$, the reflectance at the relief forming face R is very small ($R \approx 4\%$ according to the Fresnel formula) and the holographic effect is insufficient.

Accordingly, in the prior art, it has been devised to make greater the reflected light intensity by forming a thin reflective metal film having a reflectance of 90% or higher (e.g. thin aluminum film) by vapor deposition, etc., on the relief forming face, thereby to exhibit sufficient holographic effect, and most of the so-called reflection type holograms employ such a structure.

However, in the hologram of the prior art comprising a thin reflective metal film formed on the relief forming face, even if a picture pattern layer may be formed by printing on the back of the thin metal film, no picture pattern layer can be seen because the lightwave propagated through the thin metal film will be attenuated in the progress direction, and therefore it is impossible to improve the appearance from aspect of design at the hologram forming face,. Thus uses are limited.

Supports such as cards, book covers, etc., are usually applied with a display portion such as letters, picture patterns, etc., on the surface thereof, and in this case the position where the hologram is formed is a problem. Formerly, it has been generally practiced to provide a hologram at a portion where no display portion such as letters, picture patterns, etc., is applied. This is because the hologram provided on a support such as cards is generally the reflection type hologram and the hologram itself lacks transparency. Therefore provision of a hologram on the display portion such as letters will obstruct visual observation of the display portion of letters, etc., to reduce its display effect.

Accordingly, in the prior art, the hologram must but be provided at the portion where no display portion is applied, and therefore there have been drawbacks such as (1) the position where the hologram is to be formed is limited, and the degree of freedom in designing was lacking, (2) accordingly, depending on the manner of arrangement or the size of the display portion applied on the support, formation of the hologram can be done with difficulty or partial reduction of the display effect of the display portion must but be tolerated, and (3) while it is desirable to form a hologram on the display portion such as a numerical representation, magnetic recording portion, sealing portion, etc., for preventing forgery of cards or securities, it can hardly be realized for the above reasons.

Further, a reflective metal film is usually colored in silver white and is also high in luminance, and therefore there has been the problem of unaesthetic appearance when a hologram is provided on various kinds of supports such as cards, etc.

SUMMARY OF THE INVENTION

The present invention has been accomplished in view of the above points, and an object of the present invention is to provide a transparent-type hologram which is transparent and great in reflected light intensity, namely capable of exhibiting satisfactory holographic effect.

Another object of the present invention is to provide a hologram transfer sheet and a hologram adhesive sheet for forming the above transparent-type hologram on another article.

Still another object of the present invention is to provide an article on which the above transparent-type hologram is formed.

The transparent hologram of the present invention comprises a transparent hologram-forming layer and a holographic effect-enhancing layer comprising a thin transparent film, the holographic effect-enhancing layer being laminated on the hologram-forming portion of the transparent hologram-forming layer.

Also, the transparent-type hologram transfer sheet of the present invention comprises a base sheet, and a transparent-type hologram as mentioned above and an adhesive layer laminated on one side of the base sheet in the stated order.

Further, the transparent-type hologram sheet of the present invention comprises a releasing sheet, a transparent-type hologram laminated on one surface thereof, and an adhesive layer disposed between the releasing sheet and transparent-type hologram.

Still further, the transparent-type hologram article of the present invention comprises a transparent-type hologram formed on the surface of the substrate.

DETAILED DESCRIPTION OF THE INVENTION

Referring now to the drawings, the present invention is described in more detail.

[A] Transparent-type hologram

Figure 1:
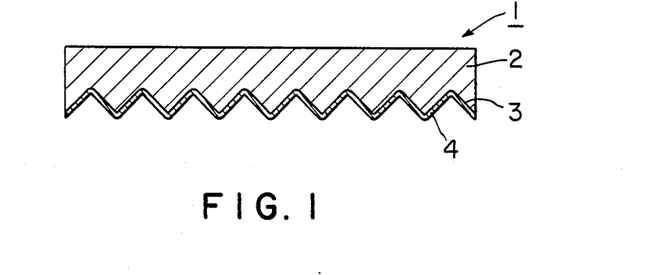
FIG. 1 and FIG. 2 are sectional views of the transparent-type hologram of the present invention.
Figure 2:
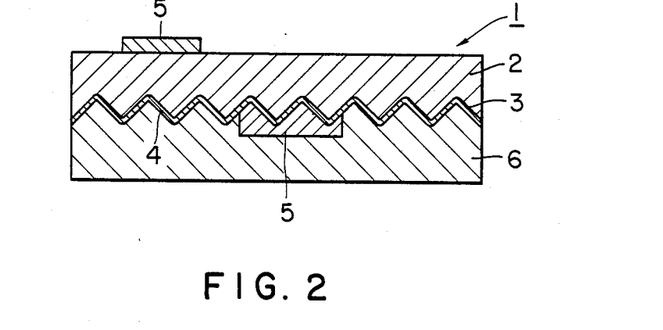

FIG. 1 shows the basic constitution of the transparent-type hologram 1 according to the present invention, the hologram 1 being made of, for example, a relief hologram, having a transparent hologram forming layer 2 having an interference fringe corresponding to the waveface of light from a body of matter formed as an uneven pattern on the surface. In the following, explanation is made by referring to an example of relief hologram.

Thus, the transparent hologram forming layer 2 has an uneven pattern in which an interference fringe is formed as an uneven pattern, namely a relief forming face 3 and further the relief forming face 3 has a holographic effect-enhancing layer 4 comprising a transparent thin film having a refractive index different from that of the hologram layer 2 formed along the shape of the uneven pattern.

In the present invention, the transparent-type hologram refers to a hologram having transparency and also having the function of a hologram while itself being transparent. In the context of the present invention, "transparent" means that the display portion existing under the hologram such as a printed layer, etc., is not consealed, and therefore a translucent hologram is also included in the present invention.

In the present invention, the relief forming face 3 may be also formed on the upper surface of the hologram forming layer 2 and, in this case, the holographic effect-enhancing layer 4 is formed beneath the hologram forming layer 2. Also, the above holographic effect-enhancing layer 4 is not limited conformation in shape along the unevenness on the relief forming face 3, but its lower surface may be flat.

The transparent-type hologram of the present invention may also have the holographic effect-enhancing layer 4 and (or) the relief forming face 3 partially provided on the hologram forming layer 2, although not shown in the drawing, and further having a non-transparent type hologram known in the art partially provided thereon.

Also, the transparent-type hologram in the present invention may be provided with a visually detectable display portion 5. This display portion 5 can be provided at any desired position, for example, either on the surface of the holographic effect-enhancing layer 4, or the surface of the hologram forming layer 2 or further on both surfaces of the holographic effect-enhancing layer 4 and the hologram forming layer 2.

The display portion 5 refers to all which can be seen, which may have either specific meanings or no meaning, and in function as a design, decoration or also intended to convey information. such display portions may include, for example, images such as letters, numerals, symbols, figures, patterns, ground patterns, etc.; instrument reading information such as a barcode, OCR, MICR, bit data, etc.; individual identifying information such as finger prints, face photographs, signs, etc.; discriminating marks such as registered trade marks, etc.; certificate representations such as a seal of a company name, registered seal, etc. The display portion may also be a continuous printed layer provided by solid printing of a desired hue.

As the means for forming the display portion 5, there may be included (1) printing, (2) silver salt photography, blue photography, diazo photography, bichromic acid gelatin photography, photoresist, photochromy, electrophotography, thermomagnetic recording, thermoplastic recording, (3) display by hard copy means, for example, electric responsive recording such as discharge recording, electrolytic recording, electrostatic recording, current passage recording, etc.; pressure-sensitive recording by use of carbon, noncarbon; physical or chemical heat-sensitive recording, (4) laser recording, holography, magnetic recording, sculpture, embossing, display such as watermark paper making process display, handwriting display, liquid crystal, etc.

Further, in the present invention, a protective layer 6 can be provided under the holographic effect-enhancing layer 4 and the display portion 5. As the material for the protective layer 6, a synthetic resin ordinarily used may be employed. Thus, by providing a protective layer 6, in addition to protection of the relief forming face and the holographic effect-enhancing layer, there is the advantage of preventing forgery which is done by templating of the relief.

Thus, provision of a protective layer under the holographic effect-enhancing layer 4 is rendered possible for the first time by the presence of the holographic effect-enhancing layer 4 as in the present invention. In the prior art, if a protective layer 6 is provided without the holographic effect-enhancing layer 4, due to the approximate equality of the refractive index of the protective layer and the hologram forming layer, the hologram cannot be sufficiently reproduced.

Further, the transparent-type hologram may also be colored in the transparent hologram forming layer and (or) holographic effect-enhancing layer.

In the following, the constituent materials, functions, etc., of the transparent-type hologram of the present invention are to be explained.

Transparent Hologram Forming Layer

The transparent hologram forming layer 2 is made generally of a resin, and the hologram forming resin layer may be either of a single layer structure or a multilayer structure (for example, one in which a hologram forming resin is provided on a substrate film, or a one in which the hologram forming resin itself consists of a laminated structure).

The transparent hologram forming layer 2 may be a plane hologram or a volume hologram. Of the plane hologram a relief hologram is particularly preferable due to bulk productivity and cost. Otherwise, it is also possible to use a laser reproduction hologram such as a Fresnel hologram, Fraunhofer hologram, lenseless Fourier conversion hologram, image hologram, etc., and white light reproduction hologram such as Ripman hologram, rainbow hologram, etc., and further color hologram, computer hologram, hologram display, multiplex hologram, holographic stereogram, holographic diffraction lattice, etc., utilizing those principles.

As the photosensitive material for formation of hologram for recording a interference fringe, silver salts, by chromic acid gelatin, thermoplastics, diazo type photosensitive materials, photoresists, strong dielectrics, photochromic materials, thermochromics materials, chalcogen glass, etc., can be used.

In the present invention, as the material for the hologram forming layer 2, it is possible to use thermoplastic resins such as polyvinyl chloride, acrylics (e.g. MMA), polystyrene, polycarbonate, etc.; cured products of thermosetting resins such as unsaturated polyesters, melamine, epoxy, polyester (meth)acrylate, urethane (meth)acrylate, epoxy (meth)acrylate, polyether (meth)acrylate, polyol (meth)acrylate, melamine (meth) acrylate, triazine acrylate, etc.; or mixtures of the above thermoplastic resin and thermosetting resin.

Further, as the material for the hologram-forming layer 2 of the present invention, heat-moldable materials having radical polymerizable unsaturated groups, and these materials include the two kinds of materials as shown below.

(1) Those having a glass transition point of 0 to 250° C. and containing radical polymerizable unsaturated groups. More specifically, as the polymer, polymers or copolymers of the compounds ① to ⑧ into which radical polymerizable unsaturated groups are introduced according to the methods (a) to (d) (discussed below) can be used.

① Monomers having hydroxyl groups: N-methyloracrylamide, 2-hydroxyethylacrylate, 2-hydroxyethylmethacrylate, 2-hydroxethylmethacrylate, 2-hydroxypropylmethacrylate, 2-hydroxybutylacrylate, 2-hydroxybutylmethacrylate, 2-hydroxy-3-phenoxypropylmethacrylate, 2-hydroxy-3-phenoxypropyl acrylate, etc;

② monomers having carboxylic groups: acrylic acid, methacrylic acid, acryloyloxyethylmonosuccinate, etc;

③ monomers having epoxy groups: glycydilmethacrylate, etc.;

④ monomers having aziridinyl groups: 2-aziridinylethyl methacrylate, allyl-2-aziridinyl propionate, etc.;

⑤ monomers having amino groups: acrylamide, methacrylamide, diacetoacrylamide, diemthylaminoethylmethacrylate, diethylaminoethylmethacrylate, etc;

⑥ monomers having sulfonic groups: 2-acrylamido-2-methylpropanesulfo acid, etc.;

⑦ monomers having isocyanate groups: adducts of diisocyanate with a radical polymerizable monomer having active hydrogen such as 1 mol/1 mol adduct of 2,4-toluenediisocyanate and 2-hydroxyethyl acrylate, etc.;

⑧ further for the purpose of controlling the glass transition point of the above copolymers or controlling the physical properties of the cured film, the above compounds can be copolymerized with monomers copolymerizable with such compounds as mentioned below. Examples of such copolymerizable monomers include methyl methacrylate, methyl acrylate, ethylacrylate ethyl methacrylate, propyl acrylate, propyl methacrylate, butyl acrylate, butyl methacrylate, isobutyl acrylate, isobutyl methacrylate, t-butyl acrylate, t-butyl methacrylate, isoamyl acrylate, isoamyl methacrylate, cyclohexyl acrylate, cyclohexyl methacylate, 2-ethylhexyl acrylate, 2-ethylhexyl methacrylate.

Next, the polymer obtained as described above can be allowed to react according to the methods (a) to (d), thereby introducing radical polymerizable unsaturated groups into the polymers to obtain hologram-forming resins.

(a) In the case of a polymer or a copolymer of a monomer having hydroxyl group, it is subjected to condensation reaction with a monomer having carboxylic group such as acrylic acid, methacrylic acid, etc.

(b) In the case of a polymer or a copolymer of a monomer having carboxylic group, sulfonic group, it is subjected to a condensation reaction with a monomer having hydroxyl group as mentioned above.

(c) In the case of a polymer or a copolymer of a monomer having epoxy group, isocyanate group or an aziridinyl group, it is subjected to an addition reaction with a monomer having hydroxyl group as mentioned above or a monomer having carboxylic group.

(d) In the case of a polymer or a copolymer of a monomer having carboxylic group or hydroxyl group, it is subjected to an addition reaction with 1:1 adduct of a monomer having epoxy group or a monomer having aziridinyl group or a diisocyanate compound and hydroxyl containing acrylate monomer.

The above reactions may be preferably carried out with the addition of a minute amount of a polymerization inhibitor such as hydroquinone while delivering dry air into the reaction mixture.

(2) Compounds having a melting point of 0 to 250° C. and having radical polymerizable unsaturated groups. Specific examples include stearyl acrylate, stearyl methacrylate, triacryl isocyanurate, cyclohexanediol diacrylate, cyclohexanediol dimethacrylate, spiroglycol diacrylate, spiroglycol dimethacrylate, etc.

Also, in the present invention, mixtures of the above (1) and (2) can be used, and further radical polymerizable unsaturated monomers may be added thereto. These radical polymerixable unsaturated monomers improve the crosslinking density during irradiation of by ionized radiation to improve heat resistance. In addition to the monomers as mentioned above, it is possible to use monomers, including ethyleneglycol diacrylate, ethyleneglycol dimethacrylate, polyethyleneglycol diacrylate, polyethyleneglycol dimethacrylate, hexanediol diacrylate, hexanediol dimethacrylate, trimethylolpropane triacrylate, trimethylolpropane trimethacrylate, trimethylolpropane diacrylate, trimethylolpropane dimethacrylate, pentaerythritol tetraacrylate, pentaerythritol tetramethacrylate, pentaerythritol triacrylate, pentaerythritol trimethacrylate, dipentaerythritol hexaacrylate, dipentaerythritol hexamethacrylate, ethyleneglycol diglycidyl ether diacrylate, ethyleneglycol diglycidyl ether dimethacrylate, polyethyleneglycol diglycidyl ether diacrylate, polyethyleneglycol diglycidyl ether dimethacrylate, propyleneglycol diglycidyl ether diacrylate, propyleneglycol diglycidyl ether dimethacrylate, polypropyleneglycol diglycidyl ether diacrylate, polypropyleneglycol diglycidyl ether dimethacrylate, sorbitol tetraglycidyl ether tetraacrylate, sorbitol tetraglycidyl ether tetramethacrylate, etc. These monomers may be used preferably in amounts of 0.1 to 100 parts by weight based on 100 parts by weight of the solids of the above copolymer mixture. The above monomers are sufficiently curable with an electron beam, but when they are to be cured with UV-ray irradiation, including benzoin ethers such as benzoquinone, benzoin, benzoin methyl ether, etc., halogenated acetophenones, biacetyls, etc.

The transparent hologram forming layer can be obtained according to a method known in the art. For example, when the transparent-type hologram is a relief hologram, a transparent hologram forming layer can be obtained according to the method, in which a hologram original plate having an interference fringe recorded in the form of unevenness is used, a resin sheet for formation of hologram is placed on the hologram original plate, both are pressure contacted by heating by means of heating roles, etc., thereby duplicating the uneven pattern on the hologram original plate onto the resin sheet surface for formation of the hologram.

Holographic Effect-Enhancing Layer

The embodiment in which a thin film layer is provided on the transparent hologram forming layer is not limited to the case of a relief hologram, but it is also similarly applicable to other holograms. For the thin film layer 4, any material can be used, provided that it can exhibit the holographic effect and does not shield the display portion of the lower layer. For example, there may be employed a transparent material having a refractive index different from that of the hologram forming layer 2, a thin reflective metal film of a thickness not exceeding 200 Å, etc. In the former case, the refractive index may be either greater or smaller than that of the hologram forming layer 2, but the difference of refractive index should preferably be not less than 0.1, more preferably not less than 0.5. According to the experiments by the present inventors, a difference not less than 1.0 is optimal. By providing a transparent thin film layer having such a different refractive index, the holographic effect can be exhibited and at the same time the display portion 5 of the lower layer cannot be shielded. On the other hand, in the latter case, a thin reflective metal with a thickness not exceeding 200 Å can allow great transmittance of light, whereby both the holographic effect and non-shielding of the display portion can be exhibited. More specifically, when a lightwave passes through a thin reflective metal film, its amplitude is abruptly reduced at exp $(-2\pi K)$ per one wave length, and therefore transmittance becomes considerably smaller if the film thickness exceeds 200 Å. Accordingly, by making the film thickness less than 200 Å, transmittance becomes enough to exhibit the holographic effect. Also, by making the film thickness not exceeding 200 Å, appearance of silver white with high luminance experienced in the prior art can also be avoided.

As the material for the holographic effect-enhancing layer, for example, the materials (1)-(6) shown below can be used.

(1) Transparent continuous thin films having greater refractive index than the hologram forming layer:

These include transparent materials in the visible region and transparent materials in the IR or UV region, the former being shown in Table 1 and the latter in Table 2. In the tables, n represents a refractive index (the same in (2)-(5)).

TABLE 1

| Transparent materials in visible region | | | |
|---|---|---|---|
| Material | n | Material | n |
| $Sb_2S_3$ | 3.0 | SiO | 2.0 |
| $Fe_2O_3$ | 2.7 | $In_2O_3$ | 2.0 |
| PbO | 2.6 | $Y_2O_3$ | 1.9 |
| ZnSe | 2.6 | TiO | 1.9 |
| CdS | 2.6 | $ThO_2$ | 1.9 |
| $Bi_2O_3$ | 2.4 | $Si_2O_3$ | 1.9 |
| $TiO_2$ | 2.3 | $PbF_2$ | 1.8 |
| $PbCl_2$ | 2.3 | $Cd_2O_3$ | 1.8 |
| $CeO_2$ | 2.2 | $La_2O_3$ | 1.8 |
| $Ta_2O_5$ | 2.2 | MgO | 1.7 |
| ZnS | 2.1 | $Al_2O_3$ | 1.6 |
| ZnO | 2.1 | $LaF_3$ | 1.6 |
| CdO | 2.1 | $CaO.SiO_2$ | 1.6 |
| $Nd_2O_3$ | 2.1 | $CeF_3$ | 1.6 |
| $Sb_2O_3$ | 2.0 | $NdF_3$ | 1.6 |
| $ZrO_2$ | 2.0 | $SiO_2$ | 1.5 |
| $WO_3$ | 2.0 | $SiO_3$ | 1.5 |
| $Pr_6O_{11}$ | 2.0 | $ThF_4$ | 1.5 |

TABLE 2

| Transparent materials in IR or UV region | |
|---|---|
| Material | n |
| CdSe | 3.5 |
| CdTe | 2.6 |

TABLE 2-continued

| Transparent materials in IR or UV region | |
|---|---|
| Material | n |
| Ge | 4.0~4.4 |
| $HfO_2$ | 2.2 |
| PbTe | 5.6 |
| Si | 3.4 |
| Te | 4.9 |
| TlCl | 2.6 |
| ZnTe | 2.8 |

(2) Transparent strong dielectrics having greater refractive index than the hologram forming layer:

These are shown in Table 3.

TABLE 3

| Material | n |
|---|---|
| CuCl | 2.0 |
| CuBr | 2.2 |
| GaAs | 3.3~3.6 |
| GaP | 3.3~3.5 |
| $N_4(CH_2)_6$ | 1.6 |
| $Bi_4(GeO_4)_3$ | 2.1 |
| $KH_2PO_4(KDP)$ | 1.5 |
| $KD_2PO_4$ | 1.5 |
| $NH_4H_2PO_4$ | 1.5 |
| $KH_2AsO_4$ | 1.6 |
| $RbH_2AsO_4$ | 1.6 |
| $KTa_{0.65}Nb_{0.35}O_3$ | 2.3 |
| $K_{0.6}Li_{0.4}NbO_3$ | 2.3 |
| $KSr_2Nb_5O_{15}$ | 2.3 |
| $Sr_xBa_{1-x}Nb_2O_6$ | 2.3 |
| $Ba_2NaNbO_{15}$ | 2.3 |
| $LiNbO_3$ | 2.3 |
| $LiTaO_3$ | 2.2 |
| $BaTiO_3$ | 2.4 |
| $SrTiO_3$ | 2.4 |
| $KTaO_3$ | 2.2 |

(3) Transparent continuous thin films having smaller refractive index than the hologram forming layer:

These are shown in Table 4.

TABLE 4

| Material | n |
|---|---|
| LiF | 1.4 |
| $MgF_2$ | 1.4 |
| $3NaF.AlF_3$ | 1.4 |
| $AlF_3$ | 1.4 |
| $GaF_2$ | 1.3 |
| NaF | 1.3 |

(4) Thin reflective metal films of a thickness not exceeding 200 Å:

The thin reflective metal film has a complex refractive index represented by $n^* = n - iK$. Here, n represents a refractive index and K an absorption coefficient.

The materials of the thin reflective metal film to be used in the present invention are shown in Table 5, and the above n and K values are also shown in the same table.

TABLE 5

| Material | n | K |
|---|---|---|
| Be | 2.7 | 0.9 |
| Mg | 0.6 | 6.1 |
| Ca | 0.3 | 8.1 |
| Sr | 0.6 | 3.2 |
| Ba | 0.9 | 1.7 |
| La | 1.8 | 1.9 |
| Ce | 1.7 | 1.4 |
| Cr | 3.3 | 1.3 |
| Mn | 2.5 | 1.3 |
| Cu | 0.7 | 2.4 |

TABLE 5-continued

| Material | n | K |
|---|---|---|
| Ag | 0.1 | 3.3 |
| Au | 0.3 | 2.4 |
| Al | 0.8 | 5.3 |
| Sb | 3.0 | 1.6 |
| Pd | 1.9 | 1.3 |
| Ni | 1.8 | 1.8 |

Other materials which can be used include Sn, In, Te, Ti, Fe, Co, Zn, Ge, Pb, Cd, Bi, Pt, Se, Ga, Rb, etc. Also, oxides, nitrides, etc., of the metals as mentioned above can be used. Further, the metals, their oxides, nitrides, etc., can be used individually or otherwise as a combination of the two or more kinds thereof.

(5) Resins having different refractive index from that of hologram forming layer:

The refractive index may be either greater or smaller than that of the hologram layer. Examples, of these are shown in Table 6.

TABLE 6

| Resin | n |
|---|---|
| Polytetrafluorethylene | 1.35 |
| Polychlortrifluorethylene | 1.43 |
| Vinyl acetate resin | 1.45~1.47 |
| Polyethylene | 1.50~1.54 |
| Polypropylene | 1.49 |
| Methyl methacrylate resin | 1.49 |
| Nylon | 1.53 |
| Polystyrene | 1.60 |
| Polyvinylidene chloride | 1.60~1.63 |
| Vinylbutyral resin | 1.48 |
| Vinylformal resin | 1.50 |
| Polyvinyl chloride | 1.52~1.55 |
| Polyester resin | 1.52~1.57 |
| Phenol-formalin resin | 1.5~1.7 |

Other than those mentioned above, synthetic resins in general can be used, particularly preferably resins with greater difference in refractive index from the hologram-forming layer.

(6) Laminates comprising suitable combinations of the above materials (1) to (5):

Any desired combination of the above materials (1) to (5) may be used, and the upper and lower positional relationships between the respective layers in the layer constitution may be selected as desired.

Of the thin film layers (1)-(6) mentioned above, the thickness of the thin film layer of (4) is 200 Å or less, and the thickness of the thin film layer of (1)-(3) and (5), (6) may be in the transparent region of the material forming the thin film, and it is generally preferred to be 10 to 10,000 Å, more preferably 100 to 5,000 Å.

As the method for forming a holographic effect-enhancing layer comprising the above thin film layer on a hologram-forming layer, when the thin film layer is made of a material of the above (1) to (4), it is possible to use thin film forming means in general such as the vapor deposition method, the sputtering method, the reactive sputtering method, the ion plating method, the electroplating method, etc.; when the thin film layer is made of a material of the above (5), coating methods in general can be used.

When the thin film layer is made of a material of the above (6) (laminate), the respective means and the methods as mentioned above can be used in a suitable combination.

In the case of the material of the above (5), it is not required to be a thin film so long as it is a transparent material, and a resin layer having a thickness greater than a thin film may be provided on the hologram-forming layer as another example of the present invention.

The transparent-type hologram can also be made only of a transparent hologram-forming layer and, in this case, it can be made of a reflection type hologram by the refractive index difference between the air and the hologram forming resin.

In the case when the transparent-type hologram is a relief hologram, when a holographic effect-enhancing layer is provided on the hologram forming layer, the display portion may be positioned either on the side where the relief is to be formed or on the side opposite to that where relief is to be formed, and either construction is suitable for the present invention. Also, in holograms other than relief holograms, the display portion may be positioned either on the side where the holographic effect-enhancing layer is to be formed or on the side opposite thereto.

In the case when the transparent-type hologram is made only of a hologram forming layer, when the transparent-type hologram is a relief hologram, it is desirable to provide the display portion so that is may be positioned on the side opposite to the relief forming surface.

Further, in the case of a relief hologram, the holographic effect-enhancing layer may be provided so that it can embed the relief forming surface therein (that is, one surface becomes a plane), or it may be provided so as to follow the relief forming surface (that is, one surface becomes an uneven surface).

Colorant

The transparent-type hologram of the present invention can be colored in any desired color. Thus, by making the hologram any desired tone, it can be harmonized with the tone of an article (e.g. ID card) to which the hologram is to be applied. Also, by coloration, forgery prevention can be also increased.

Various types of dyes can be used for coloration, including, for example, direct dyes, acidic dyes, basic dyes, mordant dyes, vat dyes, sulfide dyes, soluble vat dyes, azoic dyes, reactive dyes, cationic dyes, disperse dyes, oxidizing dyes, metal complex dyes, etc.

The dye used here should desirably be one which will not lower the transmittance of the hologram forming layer and yet does not haze the hologram forming layer, because light transmits through the hologram forming layer twice, once by entering the colored hologram forming layer and again by the light reflected against the holographic effect-enhancing layer emitting through the layer when observed as a reflection-type hologram. Since light transmittance differs depending on the thickness of the hologram forming layer, the hologram forming layer should preferably have a white light transmittance of 50% or higher and a haze value of not more than 10% as measured by a haze meter. If the white light transmittance is less than 50%, the hologram does not appear clearly and is poor in three-dimensional imprission. If the haze value exceeds 10%, milky white haze occurs in the background of the hologram, whereby the clearness of the hologram is lost and the hologram is poor in three-dimensional impression.

Additional performance may be demanded of the dyes, including resistance injection required for the material of the colored hologram-forming layer, during the method for forming the hologram forming layer and working applied to the hologram-forming layer. For example, when the hologram-forming layer is formed by use of a UV-ray curable resin, a considerable amount of UV-ray is irradiated after formation of minute uneven shape of the hologram, and therefore a dye resistant to decoloration or fading during UV-ray irradiation is preferable. On the other hand, when the hologram-forming layer is formed by use of an electron beam curable resin, it is preferable to use a dye resistant to color extinction or decoloration during electron beam irradiation.

Also, depending on the use of the hologram of the present invention, for example, when it is to be applied to cards and other times, it is preferable to use a dye with physical properties such as chemical resistance, solvent resistance, plasticiser resistance and washing fastenss.

When various practical conditions as mentioned above are taken into consideration, the dye is preferably in the form of an oil-soluble metal complex, including, for example, 1-2 type azo type metal complex dyes, 1-1 type azo type metal complex dyes, metal phthalocyanine type dyes, and organic base salts of these dyes. More specifically, the following dyes are included:

Barifast Yellow #3104 and #3105 (both produced by Orient Kagaku Kogyo Co.), Zaponfast Yellow GR (produced by BASF Co.), Eisenspiron Yellow GRH and GRH special (both produced by Hodogaya Kagaku Co.), Eisenmetalon Yellow HNRS (produced by Hodogaya Kagaku Co.), Orazol Yellow II GLM (produced by Ciba Geigy Co.), Barifast Orange #3206 (produced by Orient Kagaku Kogyo Co.), Zaponfast Orange RE, G and RR (all produced by BASF Co.), Eisenspiron Orange GRH and 2RH (produced by Hodogaya Kagaku Co.), Barifast Red #3304 and #3305 (produced by Orient Kagaky Kogyo Co.), Neozapon Red GE and Zaponfast Red GE (both produced by BASF Co.), Eisenspiron Red BEH, BEH and BEH special (produced by Hodogaya Kagaky Co.), Orazol Red II BL (produced by Ciba Geigy Co.), Eisenspiron Violet RH (produced by Hodogaya Kagaku Co.), Zaponfast Blue HFL and Zaponfast Brown BE (both produced by BAS Co.), and the like.

The pigments to be used in the hologram-forming layer may be classified broadly into organic pigments and inorganic pigments. Those belonging to the class of organic pigments include ① neutral type such as nitropigment, azopigment, anthraquinone type pigment, phthalocyanine pigment, azine type pigment, etc., ② cation type such as triphenylmethane type pigment, quithanthene type pigment, etc., ③ anion type such as azo type pigment, triphenylmethane type pigment, etc., while those belonging to the class of inorganic pigments include cobalt pigment, iron pigment, chromium pigment, manganese pigment, copper pigment, vanadium pigment, mercury pigment, lead pigment, sulfide pigment, selenium pigment, etc.

For the above pigments, it is also necessary to pay attention to the properties such as light transmittance, haze value, decoloration or fading during irradiation of UV-ray of electron beam or during heating, chemical resistance, plasticizer resistance, washing fastness, etc.

Particularly, when using a pigment, transparency is liable to become a problem as a general rule, and it is necessary to consider particle size of the pigment, wettablity and dispersibility of the pigment relative to the synthetic resin. If the particle size is too large, transparency will be lowered, while haze will be formed, if wettability and dispersibility are poor. In these senses, the pigment should have a particle size which is very small, preferable $\frac{1}{3}$ or less of the wavelength of the light.

Also, it is preferable to use a master batch or master pellet, etc., which is improved in wettability and dispersibility by dispersing the pigment at high concentration in the synthetic resin according to co-precipitation, roll milling, extruding, etc. Examples of the pigment improved in wettability and dispersibility include Cicotrans Yellow produced by Taisei Kako Co. (pigment of fine particulate iron oxide (longer diameter 0.06 μm, shorter diameter 0.02 μm) sold as Cicotrans L-2715D from BASF Co. which is made into nitro cellulose chips), HF chip 4B produced by Taisei Kako Co. (pigment of insoluble azo dye made into nitro cellulose chip).

The holographic effect-enhancing layer can also be colored with the same material and according to the same method as described above.

[B] Transparent-type Hologram Transfer Sheet

The second embodiment of the present invention is a transparent-type hologram transfer sheet for transfer formation of the transparent-type hologram as described above onto another article.

Figure 3:
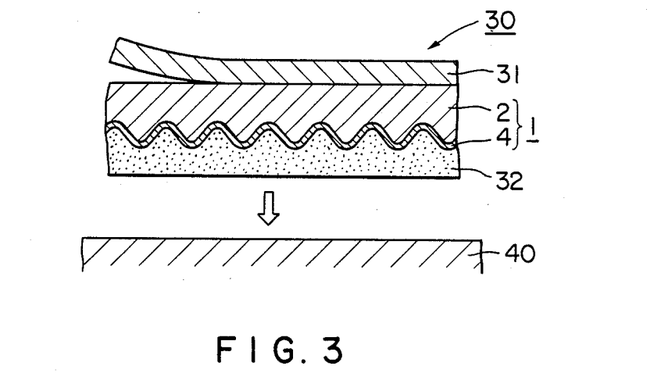
FIGS. 3 to 5 are sectional views of the transparent-type hologram transfer sheet of the present invention.

FIG. 3 shows a basic constitution of the hologram transfer sheet 30 of the present invention, consisting of a transparent-type hologram 1 and an adhesive layer 32 laminated successively on the surface of a support 31. This transfer sheet 30 is superposed so that the adhesive layer 32 may contact the surface of the material to be transferred 40, then heating and pressurization are generally applied to have the adhesive layer 32 adhered to the material to be transferred 40, followed by peel-off of the support 31.

Figure 4:
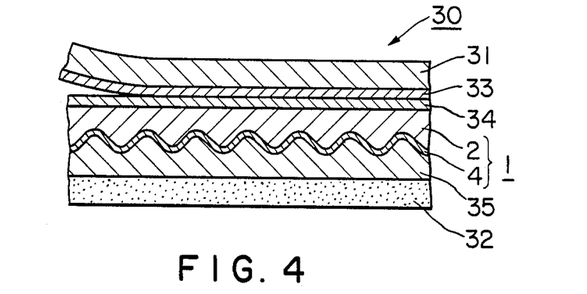

FIG. 4 is a transfer sheet according to another embodiment, having a peeling layer 33 for improvement of peeling characteristic formed on the surface of the support 31, having also a protective layer 34 for protection of the hologram provided between the peeling layer 33 and the transparent-type hologram 1, and a fragile layer 35 between the hologram 1 and the adhesive layer 32.

Figure 5:
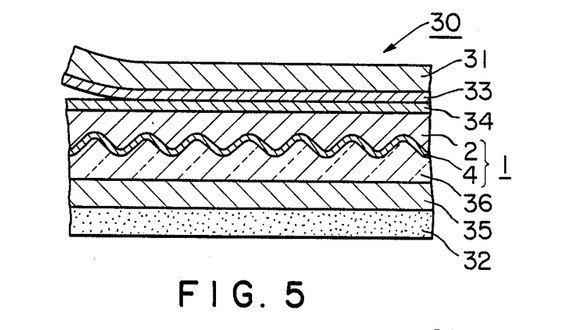

FIG. 5 is an example of the case when an anchor layer 36 is further provided between the transparent-type hologram 1 and the fragile layer 35, other constructions being the same as in the case of FIG. 4.

In the following, the material, the functions, etc., of the above respective layers are to be explained. The construction of the transparent-type hologram 1 is the same as described in the above [A].

Support (Including Peeling Layer)

The support 31 supports other layers, namely layers 2, 4, 32 in the example of FIG. 3, and can be peeled off after transfer without destroying the respective layers transferred. Therefore, at least the lower surface of the support 31 is peelable or has a peeling layer. As the peelable support, it is possible to use an appropriate paper or plastic film which is coated on the surface with a peelable paint. As the paper, tissue paper or pure paper, etc., may be used and, as the plastic film, there may be used films of plastics such as polyethylene, polypropylene, polyvinyl chloride, polyvinylidene chloride, polystyrene, polyethyleneterephthalate, polyamide, acrylic (e.g. polymethylmethacrylate), rubber hydrochloride, ethylene/vinyl acetate copolymer or ionomer, etc. Useful peelable paints are those obtained by addition of silicone resin or wax, etc., into a suitable vehicle which can be adhered onto the above paper or plastic film. Alternatively, instead of coating the paper or plastic film with a peelable paint as described above, a peeling layer can be formed by extrusion coating of a peelable resin such as polyethylene or polypropylene, etc.

Further, the plastic film alone as described above can also be used as the peelable support if adhesiveness to the synthetic resin in the material constituting the lower layer can be satisfied.

Protective Layer

The support 31 can be provided with a protective layer 34 for protection of the exposed surface of the transferred layers after transfer, if necessary.

As the material constituting the protective layer 34, various synthetic resins can be used and selected in view of performances such as abrasion resistance, staining resistance or solvent resistance, etc., depending on the uses. Examples of preferable synthetic resins include 1. mixtures of polymethylmethacrylate resin with other thermoplastic synthetic resins such as vinyl chloride/vinyl acetate copolymers or nitrocellulose resins, 2 mixtures of polymethyl methacrylate resin with polyethylene wax or 3 mixtures of cellulose acetate resins with thermosetting resins such as epoxy resin, phenol resin, melamine resin or thermosetting type acrylic resin, etc.

Fragile Layer

The function of the fragile layer 35 is to adhere the upper layer to the lower layer with sufficient adhesion strength by existing between the upper layer and the lower layer, and yet effect destruction at substantially between the layers of the fragile layer during peeling for the purpose of forgery.

Various synthetic resins can be used for constructing the fragile layer 35 for such a purpose.

Examples of the synthetic resin include styrene resins and styrene copolymers such as polystyrene, polyα-methylstyrene, etc., homo- or copolymer resins of acrylic or methacrylic resins such as polymethylmethacrylate, polyethylmethacrylate, polymethyl acrylate, polyethyl acrylate, polybutyl acrylate and the like, cellulose derivatives such as ethyl cellulose, nitrocellulose, ethylhydroxyethyl cellulose, cellulose acetatepropionate, cellulose acetate butyrate, cellulose acetate and the like, one or mixtures or copolymers of two or more of polyvinyl alcohol, polyvinyl acetate, polyvinylchloride, polypropylene, polyethylene, polyether resins, etc., thermosetting resins such as phenol resin, urea resin, melamine resin, etc.

The above synthetic resin can further incorporate 80 to 200 parts by weight of fillers such as calcium carbonate, talc, china clay, kaolin, micro silica, TiO2, glass flake, asbestos, agalmatolite powder, silica powder, barium sulfate, etc., per 100 parts by weight of the synthetic resin, whereby the coating comprising the synthetic resin and the fine powder obtained becomes further fragile than the coating comprising the synthetic resin without addition of fine powder and the interlayer peeling can be more surely be effected.

The fragile layer 35 should have a thickness preferably of about 4 to 40 μm.

When such a fragile layer as described above is provided, when it is attempted to peel the hologram after transfer, peeling occurs between the layers of the fragile layer and the therefore it is impossible to peel the hologram alone, accordingly, for amendment of the contents of printing or writing, seals or photographs at the site when hologram has been transferred, it is necessary to remove the remaining fragile layer, adhesive layer, but it is difficult to peel off these layers without accompaniment of a thick coating. Thus, this is very effective for prevention of forgery of the material to be transferred.

Further, because of having a fragile layer and an adhesive layer as the lower layers of the hologram portion (holographic effect-enhancing layer and hologram forming layer), the unevenness on the surface of the material to be adhered has minimal influence on the hologram portion and the hologram appears clearly.

Accordingly, this embodiment is useful not only for application for the materials to be attached such as certificates, ID cards, etc., which are not desired to be forged or altered as the matter of course, but also fairly useful for application to articles in the sense of decoration.

Adhesive Layer

The adhesive layer 32 is provided for plastering the hologram onto a transfer medium, and various types of adhesives can be used for the purpose of forming of this layer. Examples of the pressure sensitive adhesive may include thermosetting resins such as phenol resin, furan resin, urea resin, melamine resin, polyester resin, polyurethane resin, epoxy resin or others, thermoplastic resins, such as polyvinyl acetate resin, polyvinyl alcohol resin, polyvinyl chloride resin, polyvinyl butyral resin, poly(meth)acrylic resin, nitrocellulose, polyamide or others, rubbers such as butadiene-acrylonitrile rubber, neoprene rubber and others, or glue, natural resins, casein, sodium silicate, dextrin, starch, gum arabic, etc. Adhesives containing at least one of these components as the main component can be used. Also, these adhesives may be either of the solution type, emulsion type, powder type or film type and also either of the type solidifiable at room temperature, the type solidifiable by evaporation of solvent, or the type solidifiable by melting.

Further, the material constituting the adhesive layer in the present invention also includes tackifiers, such as acrylic resin, acrylate resins or copolymers of these, styrene-butadiene copolymer, natural rubber, casein, gelatin, rosinester, terpene resin, phenolic resin, styrene resin, couromane-indene resin, xylene, aliphatic hydrocarbon, polyvinyl alcohol, polyethylene oxide, polymethylene oxide, polyethylene sulfonic acid, etc., and it is also possible to use a heat-sensitive adhesive (in other words heat sealing agent) which can be rendered adhesive by heating. The materials constituting heat-sensitive adhesives include thermoplastic resins such as polyethylene, polyvinyl acetate or copolymers of these, acrylic resin or ethylene-acrylic acid copolymer, polyvinyl butyral, polyamide, polyester, plastified chloroprene, polypropylene, polyvinyl alcohol, polycarbonate, polyvinyl ether, polyurethane, cellulose type resins, waxes, paraffins, rosins, asphalts, etc., and uncured thermosetting resins such as epoxy resin, phenol resin, etc. By use of a heat-sensitive adhesive, the hologram transfer sheet of the present invention can be used as the heat transfer sheet. The adhesive layer 35 should have a thickness preferably of about 4 to 20 μm.

Fragile Adhesive Layer

The adhesive layer 32 and the fragile layer 35 can be also combined into one layer. For the material in this case, namely the fragile adhesive layer, it is possible to use a composition having the material for the above fragile layer added to the material for the above adhesive layer.

Anchor Layer

The anchor layer 36 functions to adhere the upper surface of the fragile layer 35 firmly onto the holographic effect-enhancing layer 4 and ensure the fragile layer 35 to be necessarily attached on the holographic effect-enhancing layer when peeling the hologram from the transfer medium. The anchor layer may also be applied between the holographic effect-enchancing layer and the adhesive layer for enhancing the adhesiveness therebetween. For the specific constituent material of the anchor layer 36, it is possible to use various materials known as an anchor layer in the prior art such as vinyl chloride, vinyl acetate, polyvinyl alcohol and copolymers of these, urethane type resins, epoxy type resins, polyester type resins, etc.

It is also possible to use an adhesive layer as a substitute for the anchor layer 36 in the same sense as the anchor layer 36 and the adhesive layer in this case may preferably have a thickness of about 4 to 20 μm.

By provision of the above anchor layer or the adhesive layer, even if the transferred hologram is carefully peeled off from the transfer medium the fragile layer 35 will necessarily be adhered onto the side of the hologram 1 to be broken between the layers of the fragile layer 35, whereby the peeled surface will have a non-uniform exposed surface to prevent reuse.

In the present invention, provision of the adhesive layer 32 has been described as an essential requirement, but it is also possible to omit the adhesive layer from the hologram transfer sheet, if an adhesive is applied onto the surface of the transfer medium.

Further, the thickness of each layer in the present invention is not particularly limited, but it is not desirable that the hologram portion protrudes from the transfer medium after transfer and, in this sense, the total thickness of the portion to be transferred should be 2 to 40 μm, preferably 2 to 10 μm.

[C]Transparent-type hologram sheet

The third embodiment of the present invention is a sheet which is constructed so as to plaster simply the transparent-type hologram as described above on the surface of another article. In the present invention the "hologram sheet" is broadly inclusive of devices capable of plastering holograms with a relatively simple means such as seal, sticker, label, etc.

Figure 6:
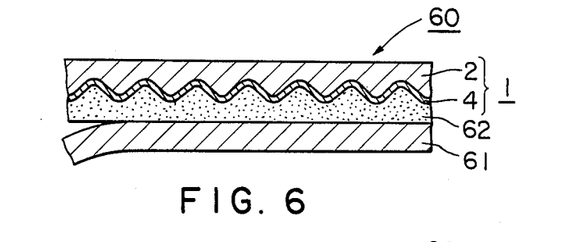
FIGS. 6 to 9 are sectional views of the transparent-type hologram sheet of the present invention.

FIG. 6 shows a basic constitution of the hologram sheet 60 of the present invention, consisting of transparent-type hologram 1 laminated through an intermediary adhesive layer 62 on the surface of a releasable sheet 61. During use the releasable sheet 61 is peeled off and the adhesive layer 62 is superposed on the surface of a material to be plastered and pressed to be plastered thereon.

Figure 7:
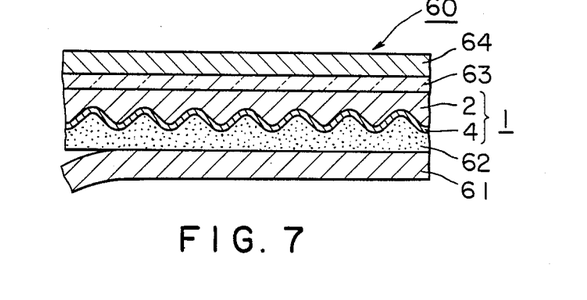

FIG. 7 shows an example of the hologram sheet according to another embodiment and in the case of this example a base sheet 64 is formed through an intermediary anchor layer 63 on the surface of the transparent-type hologram 1. This base sheet 64 supports the transparent-type hologram and also has the function of protecting the hologram.

Figure 8:
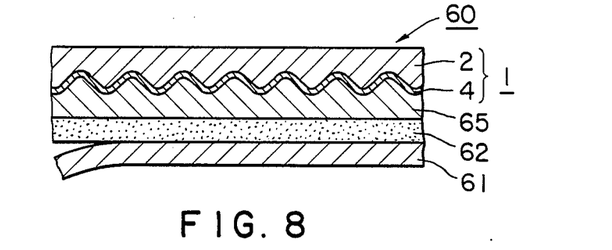

FIG. 8 shows an example in which a fragile layer 65 effective for prevention of forgery is provided between the hologram 1 and the adhesive layer 62.

Figure 9:
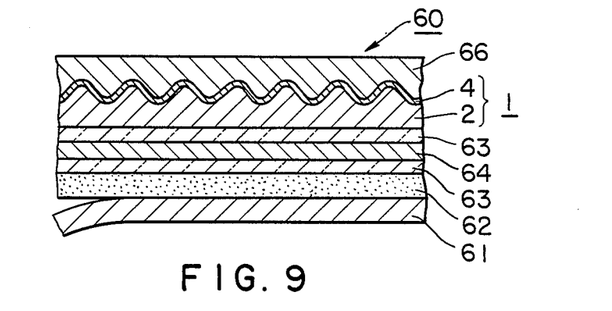

FIG. 9 shows an example when the hologram sheet is constructed by laminating an adhesive layer 62, an anchor layer 63, a base sheet 64, an anchor layer 63, a hologram forming layer 2, a holographic effect-enhancing layer 4 and a protective layer 66 in the stated order on a releasable sheet 61.

In the following, the materials, functions, etc., of the respective constituent layers of the hologram sheet of the present invention are explained.

The construction of the transparent-type hologram 1 is the same as described in the above [A].

Releasable Sheet

The releasable sheet to be used has good releasability or has a releasing layer on its surface. As such a releasable sheet, suitable papers or plastic films coated on their surfaces with releasable paints may be employed. As the paper, thin paper or pure paper may be used, while as the plastic film, plastic films of polyethyrene, polypropylene, polyvinyl chloride, polyvinylidene chloride, polystyrene, polyethyleneterephthalate, polyamide, acrylic (e.g. polymethyl methacrylate), rubber hydrochloride, ethylene/vinyl acetate copolymer or ionomer may be used. As the peelable paint, compositions comprising suitable vehicles capable of adhering to the above paper or plastic film containing a silicon resin or wax added therein may be used. Alternatively, in place of coating the paper or plastic film with the above peelable paint, a peelable layer can be also formed by extrusion coating of a peelable resin such as polyethylene or polypropylene, etc.

Adhesive Layer

The adhesive layer 62 is provided for plastering the hologram onto a transfer medium, and various types of adhesives can be used for the purpose of forming of this layer. Examples of the pressure sensitive adhesive may include thermosetting resins such as phenol resin, furan resin, urea resin, melamine resin, polyester resin, polyurethane resin, epoxy resin or others, thermoplastic resins, such as polyvinyl acetate resin, polyvinyl alcohol resin, polyvinyl chloride resin, polyvinylbutylar resin, poly(meth)acrylic resin, nitrocellulose, polamide or others, rubbers such as butadiene-acrylonitrile rubber, neoprene rubber and others, or glue, natural resins, casein, sodium silicate, dextrin, starch, gum arabic, etc. Adhesives containing at least one of these components as the main component can be used. Also, these adhesives may be either of the solution type, emulsion type, powder type or film type and also either of the type solidifiable at room temperature, the type solidifiable by evaporation of solvent, or the type solidifiable by melting.

Further, the material constituting the adhesive layer in the present invention is also inclusive of those called as tackifiers, such as acrylic resin, acrylate resins or copolymers of these, styrene-butadiene copolymer, natural rubber, casein, gelatin, rosin ester, terpene resin, phenolic resin, styrene resin, couromane-indene resin, xylene, aliphatic hydrocarbon, polyvinyl alcohol, polyethylene oxide, polymethylene oxide, polyethylene sulfonic acid, etc., and it is also possible to use a heat-sensitive adhesive (in other words, heat sealing agent) which can be rendered adhesive by heating. The materials constituting heat-sensitive adhesives include thermoplastic resins such as polyethylene, polyvinyl acetate or copolymers of these, acrylic resin or ethylene-acrylic acid copolymer, polyvinyl butyral, polyamide, polyester, plastified chloroprene, polypropylene, polyvinyl alcohol, polycarbonate, polyvinyl ether, polyurethane, cellulose type resins, waxes, paraffins, rosines asphalts, etc., and uncured thermosetting resins such as epoxy resin, phenol resin, etc.

Fragile Layer

The function of the fragile layer 65 is to adhere the upper layer to the lower layer with sufficient adhesion strength by existing between the upper layer and the lower layer, and yet effect destruction substantially between the layers of the fragile layer during peeling for the purpose of forgery.

Various synthetic resins can be used for constructing the fragile layer 65 for such a purpose.

Examples of the synthetic resin include styrene resins and styrene copolymers such as polystyrene, poly-α-methylstyrene, etc., homo- or copolymer resins of acrylic or methacrylic resins such as polymethyl methacrylate, polyethyl methacrylate, polymethyl acrylate, polyethyl acrylate, polybutyl acrylate and the like, cellulose derivatives such as ethyl cellulose, nitrocellulose, ethylhydroxyethyl cellulose, cellulose acetatepropionate, cellulose acetate butyrate, cellulose acetate and the like, one or mixtures or copolymers of two or more of polyvinyl alcohol, polyvinyl acetate, polyvinyl chloride, polypropylene, polyethylene, polyether resins, etc., thermosetting resins such as phenol resin, urea resin, melamine resin, etc.

The above synthetic resin can further incorporate 80 to 200 parts by weight of fillers such as calcium carbonate, talc, china clay, kaolin, micro silica, $TiO_2$, glass flake, asbestos, agalmatolite powder, silica powder, barium sulfate, etc., per 100 parts by weight of the synthetic resin, whereby the coating comprising the synthetic resin and the fine powder obtained becomes further fragile than the coating comprising the synthetic resin without addition fine powder and the inter-layer peeling can be more surely be effected.

The fragile layer 35 should have a thickness preferably of about 4 to 40 μm.

When such a fragile layer as described above is provided, when it is attempted to peel the hologram after transfer, destruction occurs between the layers of the fragile layer and it is therefore impossible to peel the hologram as itself, accordingly, for amendment of the contents of printing or writing, seals or photographs at the site when hologram has been transferred, it is necessary to remove the remaining fragile layer, adhesive layer, but it is difficult to peel off these layers without accompaniment of a thick coating. Thus, this is very effective for prevention of forgery of the material to be transferred.

Further, because of having a fragile layer and an adhesive layer as the lower layers of the hologram portion (holographic effect-enhancing layer and hologram forming layer), the unevenness on the surface of the material to be adhered has minimal influence on the hologram portion and that hologram appears clearly.

Accordingly, this embodiment is useful not only for application for the materials to be attached such as certificates, ID cards, etc., which are not desired to be forged or altered as the matter of course, but also fairly useful for application to articles in the sense of decoration.

Fragile Adhesive Layer

The adhesive layer 62 and the fragile layer 65 can be also combined into one layer. For the material in this case, namely the fragile adhesive layer, it is possible to use a composition having the material for the above fragile layer added to the material for the above adhesive layer.

Base Sheet

A suitable paper or plastic film, a metal plate, a metal foil, a glass plate or a composite material thereof can be used. As the paper on the plastic film, those as mentioned in the explanation of the releasable sheet can be used.

Protective Layer

As the material constituting the protective layer 66, various synthetic resins can be used and selected in view of performances such as abrasion resistance, staining resistance or solvent resistance, etc., depending on the uses. Examples of preferable synthetic resins include (1) mixtures of polymethylmethacryate resin with other thermoplastic synthetic resins such as vinylchloride/vinylacetate copolymers or nitrocellulose resins, (2) mixtures of polymethylmethacrylate resin with polyethylene wax or (3) mixtures of cellulose acetate resins with thermosetting resins such as epoxy resin, phenol resin, melamine resin or thermosetting type acrylic resin, etc. (4) ionized radiation curable type resins such as UV-ray curable type resins or electron beam curable type resins, etc.

Anchor Layer

The anchor layer 63 is formed for improvement of the bonding characteristic of the laminated product. Specific constituent layers of the anchor layer 63 may include vinyl chloride, vinyl acetate, polyvinyl alcohol and copolymers of these, urethane type resin, epoxy type resin polyester type resin and others which have been widely used in the prior art as the anchor layer material.

In the transparent-type hologram sheet or the transparent hologram transfer sheet, the printing layer may be provided between the respective layers of a plural number of layers of the protective layer 34, or between the base sheet 64 and the anchor layer 63, or on the upper surface of the base sheet 64. It is also possible to apply coloration on the protective layer 34 and the anchor layer 63.

[D]Transparent-type Hologram Article

The fourth embodiment of the present invention is an article applied with the above transparent-type hologram.

Figure 10:
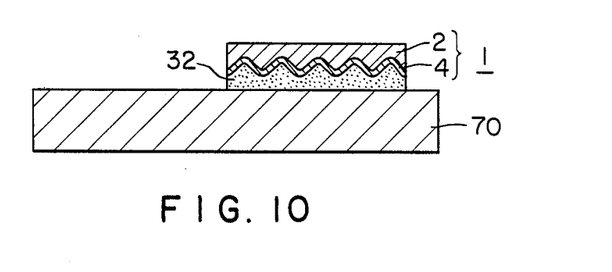
FIG. 10 and FIG. 11 are sectional views of the transparent-type hologram articles of the present invention.
Figure 11:
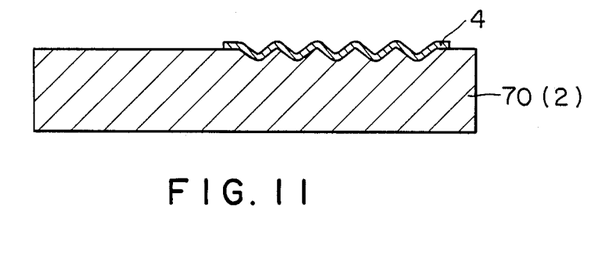

The embodiments for producing such articles include the case in which a transparent-type hologram 1 is separately provided on the surface of the substrate 70 of an article (FIG. 10) and the case in which the substrate 70 itself of an article constitutes a hologram forming layer 2 (that is, the case the substrate 70 and the hologram forming layer are integrated) (FIG. 11).

Figure 12:
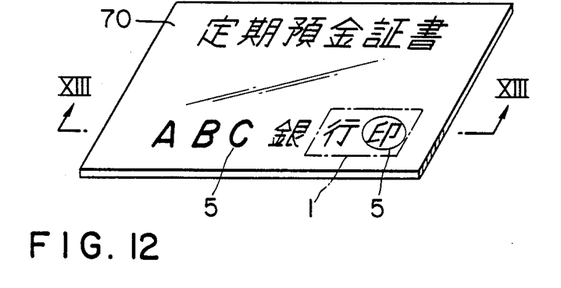
FIG. 12 and FIG. 14 are plan views of respective hologram articles of the present invention.
Figure 13:
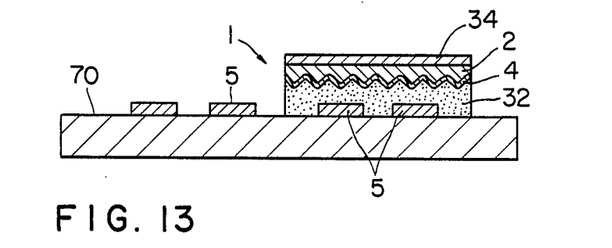
FIG. 13 and FIG. 15 are sectional views taken along the XIII—XIII line in FIG. 12, and along the XV—XV line in FIG. 14, respectively.
Figure 14:
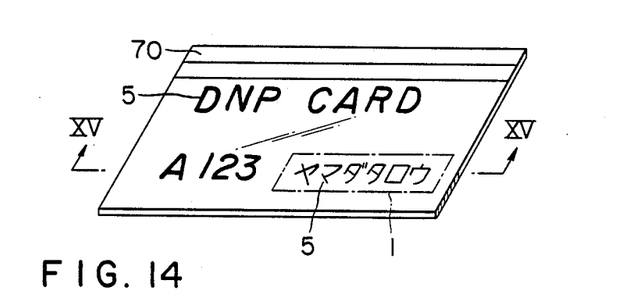
Figure 15:
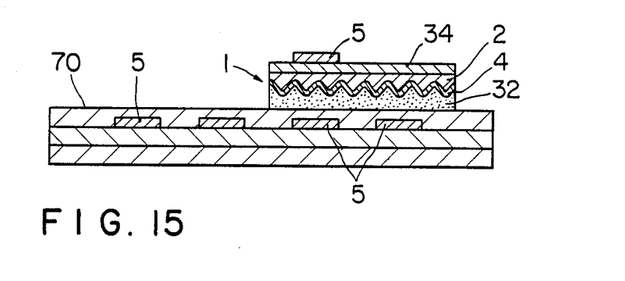

In the following, by use of the transparent-type hologram transfer sheets 30 shown in FIG. 3 to FIG. 5 and the transparent-type hologram seals 60 shown in FIG. 6 to FIG. 9, examples of the cases when forming transparent-type holograms on practical articles are shown in FIG. 12 to FIG. 15. FIG. 12 and FIG. 13 show an example of the case when a transparent-type hologram is formed on a fixed deposit certificate, and FIG. 14 and FIG. 15 show an example of the case when a transparent-type hologram is formed on a magnetic card such as credit card, etc.

In these examples, the display portion 5 such as a letter or picture pattern, etc., may be provided on the substrate 70 as shown in FIG. 13 and FIG. 12 or alternatively on the surface of the holographic effect-enhancing layer 4 (lower surface) which is not particularly shown. When the display portion 5 is provided on the substrate 70, the display portion 5 may be provided on either the upper surface of the substrate 70 as shown in FIG. 13 or internally of the substrate 70 as shown in FIG. 15, or also both on the surface and internally of the substrate 70. Further, the display portion 5 is not limited to the case where it is provided as the position lower than the transparent-type hologram 1, but it can also be provided at the upper position of the transparent-type hologram 1 as shown in FIG. 15.

Also, the transparent-type hologram 1 may be further provided with protective layers such as a protective plate, a protective film, a protective coating layer, etc. For example, in the case of a three-layer laminated plastic card, a picture pattern layer may be provided on the vinyl chloride core sheet, further transparent-type hologram is provided thereon, and transparent vinyl chloride over-sheets are placed over and beneath the sheet, followed by heat fusion to provide a plastic card equipped with a transparent-type hologram.

As the material for the substrate 70, there may e employed papers such as Japanese paper, craft paper, Clupak paper, crepe paper, paper for corrugated fiber board, pure paper, paper for OCR, paper for MICR, paper for form, coated paper, art paper, synthetic paper, etc.; paper board such as book binding cloth paper, leather, etc.; plastics such as polyvinylchloride, thermoplastic polyester, polymethacrylate, polyvinylacetate, polyacrylate, polyethylene, polypropylene, polystyrene, polyvinylidene chloride, polyacrylonitrile, polycarbonate, polyamide, polyurethane, polyimide, cellulose type resin, synthetic rubber type resin, natural rubber type resin, phenol resin, urea resin, melamine resin, epoxy resin, alkyd resin, unsaturated polyester resin, and mixed resins according to suitable combinations thereof and copolymer resins, etc.; rubbers such as synthetic rubbers, natural rubber, etc.; copper, iron, aluminum, tin, lead and alloys according to suitable combinations thereof; fibers such as cotton, rayon, chemical fiber, glass fiber, unwoven fabric, etc.; wood type material such as wood and others; glasses; composite materials according to suitable combinations of the above various materials, etc.

The substrate 70 can be in various forms such as leaf paper, board, sheet, film, foil, etc., and its shape and thickness can be selected as desired. The substrate 70 may be either transparent or opaque, and therefore the transparent-type hologram 1 may be either a reflection type hologram or a transmission type hologram. For providing a transparent type hologram 1 on the substrate 70, a hologram transfer sheet 30 shown in FIG. 3 to FIG. 5 may be formed and this may be provided according to a transfer system. Alternatively a hologram seal 60 as shown in FIG. 6 to FIG. 9 may be formed, and this may be provided according to an adhesion system.

For example, a hologram transfer sheet 30 is superposed on a substrate 70 so that the adhesive layer 32 may contact the surface of the substrate 70, followed by heating and pressurization, and the support 31 is peeled off, whereby the transparent-type hologram 1 is transferred onto the substrate 70 (FIG. 13). Such a construction can be applied to the example of the transparent-type hologram article of the present invention forming a fixed deposit certificate, comprising the substrate 70, the display porition 5 formed by printing of the name of bank and certification seal, and a transparent-type hologram 1 provided on the display portion 5.

FIG. 14 and FIG. 15 show an example of the case when forming a transparent-type hologram 1 on a magnetic card by use of a hologram sheet 60 as shown in FIG. 6 to FIG. 9. That is, by peeling off a releasable sheet 61 of the hologram sheet 60 and plastering the adhesive layer 62 at a desired portion on the substrate 70, a transparent-type hologram can be provided on the substrate 70. Such a construction is applicable to an example of the transparent-type hologram article of the present invention as shown in FIG. 14, comprising a substrate 70 forming a magnetic card, a display portion 5 displaying the name of the owner of the magnetic card and a transparent-type hologram 1 provided on the display portion 5.

In the example in which the display portion 5 is provided on the substrate 70, the display portion is not limited to the case where it is previously provided on the substrate 70. For example, in constructing the above hologram transfer sheet or hologram sheet, the display portion 5 can be provided at the lower position or internally of each adhesive layer, so that the display portion 5 can be transferred and plastered together with the transparent hologram when the hologram transfer sheet, hologram sheet is transferred and plastered on the substrate 70, respectively. Also, the transparent-type hologram is not limited to the case of being provided on a smooth surface, but it can be also provided on a display portion having letters, etc., formed by emboss in the form of a convexity, or further the hologram itself may be embossed.

In the present invention, the substrate on which the transparent-type hologram is to be formed is inclusive of all articles, merchandise and products. Accordingly, specific examples of the transparent-type hologram articles of the present invention include packages such as cartons, containers, bags, cassette cases, cassette halfs, floppy cases, packaging papers, etc.; securities such as certificates of stock, checks, drafts, bills, certificates, bank books, tickets for vehicles and horses, stamps, postage books, tickets for vehicles and horses, stamps, postage stamps, viewing tickets, etc.; cards such as cash cards, credit cards, member's cards, greeting cards, telephone cards, postage cards, name cards, IC cards, etc.; otherwise, account books or chits, envelopes tags, book marks, calenders, posters, pamphlets, passports, POP articles, coasters, displays, nameplates, keyboards, cosmetics, ornaments (watches, lighters), stationary, construction materials, ratios, television, speakers, electronic calculators, meter panels of automobiles, emblems, keys, clothing, footware, devices, OA instruments, lens of spectacles, coverglass of watches, display portions, of electronic calculators, card cases, cosmetic cases, stationary, tableware, glassware, decoratives made of glass, glass plate, liquid containers, plastic vessels, decoratives made of plastic, plastic plate, scientific laboratory instruments, ornaments, package film of tobacco, packaging films in general, cover cases of books, POP articles, nameplates, construction materials, meter panels of automobiles, OA instrument display portions and main body, gift articles, display portions and main body of electrical articles, toys, etc.

In the present invention when the transparent-type hologram is constructed of a reflection type hologram, due to the angle dependency of reproduction which is a characteristic of the hologram, it appears merely as a transparent body outside the angle range within which reproduction of hologram is possible, and reflectance of light becomes the maximum within the angle range within which reproduction of hologram is possible to give the effect as a reflection type hologram.

In the present invention, a holographic effect-enhancing layer comprising, for example, a transparent thin film having a refractive index different from, or greater than that of the hologram forming layer on the relief forming surface of the hologram layer and therefore necessary and sufficient transparency and reflected light intensity can be obtained. As a result, even when a picture pattern layer is provided as the lower layer of the hologram, the picture layer can be seen from the outside and also satisfactory hologram effect can be exhibited.

Thus, according to the present invention, by application of various patterns and coloration on the picture pattern layer, there is the effect of providing a hologram excellent in appearance.

Also, in the prior art, when a protective layer is to be provided on the relief forming surface, there is involved the drawback that the hologram effect is lost, because there is little difference in refractive index between the hologram forming layer and the protective layer, whereby no reflection, refraction and therefore diffraction occurs at the interface. In contrast according to the present invention, even when a protective layer is provided on the surface of the holographic effect-enhancing layer, there is neither deterioration or disappearance of the holographic effect. Also, there is neither deterioration or disappearance of the holographic effect by formation of the picture pattern layer by printing, but satisfactory holographic effect can be exhibited.

Further, since reproduction in the transparent type hologram of the present invention is effected only within a specific reproduction angle range, no hologram is recognized at other ordinary angles. This leads to the advantage of obstructing no visual feature of the design and picture pattern of the article and the article surface when the hologram is laminated on another article, whereby obscuring an underlying design which is necessarily experienced when providing a reflection type hologram having a reflective metal thin film of the prior art on various substrates can be avoided.

Further, in the vicinity of the angle range within which a hologram can be reproduced, both the hologram and the picture pattern can be seen by changing more or less the position of observation, thus enabling exhibition of both aspects of the design.

EXAMPLE A-1

By use of a mixed resin comprising a mixture of an acrylic resin and a melamine resin at a weight ratio of 4:1, a hologram layer (refractive index: n=1.4) was formed, and a thin ZnS film (refractive index: $n_1=2.3$) was formed on the relief forming surface of said hologram layer. Vapor deposition was effected on the relief forming surface under the condition of a vacuum degree of $10^{-5}$ torr, by sublimating ZnS according to the tantalum boat resistance heating system, while measuring the thickness according to the quartz oscillation.

When vapor deposition was effected to (a density of ZnS $\rho=4.1$) $\Delta f \approx 2,400$ Hz, the thin film of ZnS had a thickness of $d \approx 1,200$ Å (thickness: $d=2\Delta f/\rho$). After a picture pattern was printed on the ZnS surface, a protective layer (by use of a resin with a refractive index $n_2=1.4$) was provided thereon. As a result, sufficient hologram effect was recognized. Also, the picture pattern layer could be seen from the outside and it was also found to be excellent in transparency.

EXAMPLE B-1

A hologram transfer sheet was prepared by use of a polyester film with a thickness of 25 μm as the substrate and coating one surface of this film successively with a peelable protective layer (thickness 0.5 μm), a hologram forming layer (thickness 2.5 μm), a metal reflective layer (100 Å), a fragile layer (20 μm) and heat sensitive adhesive layer (5 μm) with the use of the respective compositions of (1), (2), (3)(, (4) and (5) shown below.

The metal reflective layer was laminated according to the vacuum deposition method in place of coating.

| (1) Composition for peelable protective layer: | |
|---|---|
| Cellulose acetate resin | 5 parts by wt. |
| Methanol | 25 " |
| MEK | 45 " |
| Toluene | 25 " |
| Methylolated melamine resin | 0.5 " |
| Para-toluene sulfonic acid | 0.05 " |
| (2) Composition for hologram forming layer: | |
| Acrylic resin | 40 parts by wt. |
| Melamine resin | 10 " |
| Anone | 50 " |
| MEK | 50 " |
| (3) Material for metal reflective layer: | |
| Aluminum | |
| (4) Composition for fragile layer: | |
| Vinylchloride-vinyl-acetate copolymer | 20 parts by wt. |
| Acrylic resin | 10 " |
| Micro silica | 30 " |
| Ethyl acetate | 20 " |
| Toluene | 50 " |
| (5) Composition for heat sensitive adhesive layer: | |
| Vinyl chloride-vinyl acetate copolymer | 20 parts by wt. |
| Acrylic resin | 10 " |
| Ethyl acetate | 20 " |
| Toluene | 50 " |

By use of the hologram transfer sheet, the hologram was transferred onto the written column of a certificate by means of a hot press.

The hologram transferred, even when attempted to peel off carefully, was broken at the portion of the fragile layer, and therefore it was impossible to peel it off in the form of itself, and the reuse thereof was impossible.

EXAMPLE B-2

A hologram transfer sheet was prepared by use of a polyester film with a thickness of 25 μm as the substrate and coating one surface of this film successibly with a peelable protective layer (thickness 0.5 μm), a hologram forming layer (thickness 2.5 μm), a holographic effect-enhancing layer (500 Å) and a fragile heat sensitive adhesive layer (20 μm) with the use of the respective compositions of (1), (2), (3) and (4) shown below.

The metal reflective layer was laminated according to the sputtering method in place of coating.

| (1) Composition for peelable protective layer: | |
|---|---|
| Cellulose acetate resin | 5 parts by wt. |
| Methanol | 25 " |
| MEK | 45 " |
| Toluene | 25 " |
| Methylolated melamine resin | 0.5 " |
| Para-toluene sulfonic acid | 0.05 " |
| (2) Composition for hologram forming layer: | |
| Acrylic resin | 40 parts by wt. |
| Melamine resin | 10 " |
| Anone | 50 " |
| MEK | 50 " |
| (3) Material for holographic effect-enhancing layer: | |

-continued

| | |
|---|---|
| TiO₂ | |
| (4) Composition for fragile heat sensitive adhesive layer: | |
| Acrylic acid ester resin | 20 parts by wt. |
| Toluene | 40 " |
| Ethyl acetate | 40 " |
| Polyisocyanate type crosslinking agent | 0.5 " |
| Micro silica | 40 " |

By use of the hologram transfer sheet, the hologram was transferred onto the written column of a certificate by means of a hot press.

The hologram transferred, even when attempted to peel off carefully, was broken at the portion of the fragile layer,a and therefore it was impossible to peel it off in the form of itself, and the reuse thereof was impossible.

EXAMPLE C-1

A hologram sheet was prepared by use of a polyester film with a thickens of 25 μm as the substrate and coating one surface of this film successively with a peelable protective layer (thickness 0.5 μm), a hologram forming layer (thickness 2.5 μm), a metal reflective layer (100 Å), a fragile layer (20 μm) and a pressure sensitive adhesive layer (5 μm) with the use of the respective compositions of (1), (2), (3), (4) and (5) shown below.

The metal reflective layer was laminated according to the vacuum deposition method in place of coating.

| | |
|---|---|
| (1) Composition for peelable protective layer: | |
| Cellulose acetate resin | 5 parts by wt. |
| Methanol | 25 " |
| MEK | 45 " |
| Toluene | 25 " |
| Methylolated melamine resin | 0.5 " |
| Para-toluene sulfonic acid | 0.05 " |
| (2) Composition for hologram forming layer: | |
| Acrylic resin | 40 parts by wt. |
| Melamine resin | 10 " |
| Anone | 50 " |
| MEK | 50 " |
| (3) Material for metal reflective layer: | |
| Aluminum | |
| (4) Composition for fragile layer: | |
| Vinyl chloride-bisvinyl acetate copolymer | 20 parts by wt. |
| Acrylic resin | 10 " |
| Micro silica | 30 " |
| Ethyl acetate | 20 " |
| Toluene | 50 " |
| (5) Composition for pressure sensitive adhesive layer: | |
| Acrylic pressure sensitive adhesive (Nippon Carbide Kogyo K.K., Nissetsu PE-118, 40% toluene/ethyl acetate solution) | 100 parts by wt. |
| Polyisocyanate type crosslinking agent | 1 part by wt. (calculated on solide) |
| (Nippon Polyurethane K.K., Colonate L) | |
| Toluene | 50 " |
| Ethyl acetate | 50 " |

The hologram seal obtained was attached to by hand on the written column of a certificate, and then the polyester film was peeled off.

The hologram transferred, even when attempted to peel off carefully, was broken at the portion of the fragile layer, and therefore it was impossible to peel it off in the form of itself.

EXAMPLE C-2

A hologram transfer sheet was prepared by use of a polyester film with a thickness of 25 μm as the substrate and coating one surface of this film successibly with a peelable protective layer (thickness 0.5 μm), a hologram forming layer (thickness 2.5 μm), a holographic effect-enhancing layer (250 Å) and a fragile heat sensitive adhesive layer (20 μm) with the use of the respective compositions of (1), (2), (3) and (4) shown below.

The metal reflective layer was laminated according to the sputtering method in place of coating.

| | |
|---|---|
| (1) Composition for peelable protective layer: | |
| Cellulose acetate resin | 5 parts by wt. |
| Methanol | 25 " |
| MEL | 45 " |
| Toluene | 25 " |
| Methylolated melamine resin | 0.5 " |
| Para-toluene sulfonic acid | 0.05 " |
| (2) Composition for hologram forming layer: | |
| Acrylic resin | 40 parts by wt. |
| Melamine resin | 10 " |
| Anone | 50 " |
| MEK | 50 " |
| (3) Material for holographic effect-enhancing layer: | |
| TiO₂ | |
| (4) Composition for fragile heat sensitive adhesive layer: | |
| Acrylic acid ester resin | 20 parts by wt. |
| Toluene | 40 " |
| Ethyl acetate | 40 " |
| Polyisocyanate type crosslinking agent | 0.5 " |
| Micro silica | 40 " |

By use of the hologram transfer sheet, the hologram was transferred onto the written column of a certificate by means of a hot press.

The hologram transferred, even when attempted to peel off carefully, was broken at the portion of the fragile layer, and therefore it was impossible to peel it off in the form of itself, and the reuse thereof was impossible.

EXAMPLE D-1

A hologram transfer sheet was obtained by forming successively a protective layer, a hologram forming layer, a holographic effect-enhancing layer and a heat sensitive adhesive layer on one surface of a base film comprising a polyester with a thickness of 25 μm. The compositions of the respective layers are shown below. The hologram forming layer was constructed as a relief hologram after formation of the resin layer.

| | |
|---|---|
| Protective layer composition | |
| Cellulose acetate resin | 5 parts by wt. |
| Methanol | 25 " |
| Methyl ethyl ketone | 45 " |
| Toluene | 25 " |
| Methylolated melamine resin | 0.5 " |
| para-toluene sulfonic acid | 0.05 " |
| Hologram forming layer composition | |
| Acrylic resin | 40 parts by wt. |
| Melamine resin | 10 " |
| Anone | 50 " |

| -continued | |
|---|---|
| Methyl ethyl ketone | 50 " |
| Holographic effect-enhancing layer composition | |
| ZnS | |
| Heat sensitive adhesive layer composition | |
| Vinyl chloride-vinyl acetate copolymer | 20 parts by wt. |
| Acrylic resin | 10 " |
| Ethyl acetate | 20 " |
| Toluene | 50 " |

On the printed portion on a fixed deposit certificate having letters and a picture pattern provided by offset printing system on a pure paper, the hologram transfer sheet as obtained above was superposed so that the adhesive layer contact the printed portion, and then heating and pressurization were effected under the conditions of 170° C. and 50 kg/cm² by pressing a hot plate against the base film side, followed by peel-off of the base film to have the transparent-type hologram transferred on the fixed deposit certificate. When the fixed deposit certificate equipped with the hologram was observed, letters, etc., could be seen from above the hologram and also a three dimensionally reproduced image of the hologram could be recognized by observation with an angle changed.

EXAMPLE D-2

The following composition was refluxed for 6 hours to carry out copolymerization.

| Methyl methacrylate | 284 parts by wt. |
|---|---|
| 2-hydroxyethyl methacrylate | 130 parts by wt. |
| Ethyl acetate | 1100 parts by wt. |
| α, α'-azobisisobutylnitrile | 2 parts by wt. |

Subsequently, 0.1 part by weight of paramethoxyphenol was added to the resultant reaction product to terminate the reaction and then 100 parts by weight of 1 mol/1 mol adduct of 2-hydroxyethyl acrylate and 2,4-toluene diisocyanate were added and further 5 parts by weight of dibutyltin dilaurate, and the reaction was carried out at 80° C. for 5 hours, while delivering dry air thereinto.

After the reaction mixture was cooled to room temperature, 15 parts by weight of a UV-ray sensitizing material (Irgacure 184, produced by Ciba Geigy Co.) were added and homogeneously dissolved in the mixture to obtain a UV-ray curable resin composition.

As the next step, the above UV-ray curable resin composition was applied on a substrate sheet of a polyethyleneterephthalate film with a thickness of 200 μm to a thickness of 2 μm to prepare a film for formation of hologram. This film for hologram could be stored under a wound-up state without tackiness at room temperature.

Next, the resin face of the film obtained was superposed on the uneven face of a mold on which a hologram was recorded in shape of unevenness and the mold was adhered to the above film by heating under pressurization by means of nip rolls at 150° C. under a pressure of 20 kg/cm².

Then, these were passed under adhered state, 10 cm under UV-ray lamp having an output of 80 W/cm at a speed of 10 m/min. to be irradiated with UV-ray from the film side to cure the coated resin. Thereafter, the above film was peeled off from the mold to obtain a relief hologram.

As the next step, TiO₂ was evaporated by heating according to the electron beam heating system to form a thin film of 200 Å as the holographic effect-enhancing layer on the relief forming surface by vacuum deposition.

Subsequently, while forming a 20 μm film by coating of a pressure sensitive adhesive of an acrylic acid ester type on the releasing face of a releasing paper coated on a paper base with a silicone resin, the above hologram forming film was contacted at the holographic effect-enhancing layer side with the adhesive surface to effect dry lamination, to obtain a hologram sheet.

The hologram sheet was die cut in a suitable form to obtain a hologram label, and the releasing paper of the label was peeled off and the hologram was attached to a plastic card.

The plastic card was formed by laminating the three of a 100 μm vinyl chloride film having a magnetic stripe transferred thereon, 560 μm rigid vinyl chloride core printed with letters and a picture pattern by offset printing and a further another 100 μm vinyl chloride film in the form of a sandwich with the vinyl chloride core as the center, followed by heating and a pressurization under the conditions of 150° C. and 50 kg/cm². The hologram label was attached at the position corresponding to the printed picture pattern.

When the card equipped with the hologram obtained was observed, letters could be seen from above the hologram and also a three dimensional reproduced image of the hologram could be confirmed by observation with an angle changed.

What is claimed is:

1. A transparent reflection-type hologram comprising:
   a transparent hologram-forming layer including a relief-hologram forming surface, and
   a holographic effect-enhancing layer comprising a thin transparent film,
   said holographic effect-enhancing layer having a refractive index $n_2$ different from a refractive index $n_1$ of said transparent hologram-forming layer and being formed on the relief-hologram forming surface of the transparent hologram-forming layer, the difference between the refractive index $n_1$ and the refractive index $n_2$ being more than 0.2.

2. A transparent reflection-type hologram as claimed in claim 1, wherein $n_2 - n_1 \geq 1.0$.

3. A transparent reflection-type hologram as claimed in claim 1, wherein said holographic effect-enhancing layer comprises a thin metal film of a thickness not-laimed in claim exceeding 200 Å.

4. A transparent reflection-type hologram as claimed in claim 1, wherein said holographic effect-enhancing layer is disposed on a part or parts of said transparent hologram-forming layer.

5. A transparent reflection-type hologram as claimed in claim 1, wherein a hologram is formed on at least a part of said transparent hologram-forming layer.

6. A transparent reflection-type hologram as claimed in claim 1, wherein a printed layer is formed on the surface of and/or inside said transparent hologram-forming layer and/or said holographic effect-enhancing layer.

7. A transparent reflection-type hologram as claimed in claim 1, wherein at least one of said transparent hologram-forming layer and holographic effect-enhancing layer is colored.

8. A transparent-type hologram as claimed in claim 1, wherein said holographic effect-enhancing layer is formed of a material selected from the groups consisting of (a) transparent ferroelectrics having a higher refractive index than the transparent hologram-forming layer; (b) a thin transparent film having a lower refractive index than the transparent hologram-forming layer; (c) a resin having a refractive index different from that of the transparent hologram-forming layer; (d) a thin metal film of a thickness not exceeding 200 Å; and (e) a laminate structure formed by combined (a) through (d).

9. A transparent-type hologram as claimed in claim 1, wherein said holographic effect-enhancing layer comprises a thin film of a material selected from the group consisting of SiO, $In_2O_3$, TiO, $ThO_2$, $Si_2O_3$, $PbF_2$, $Cd_2O_3$, $La_2O_3$, MgO, $Al_2O_3$, $LaF_3$, $CaOSiO_2$, $CeF_3$, $NdF_3$, $SiO_2$, $SiO_3$, $ThF_4$, $Sb_2S_3$, $Fe_2O_3$, PbO, ZnSe, CdS, $Bi_2O_3$, $TiO_2$, $PbCl_2$, $CeO_2$, $Ta_2O_5$, ZnS, ZnO, CdO, $And_2O_3$, $Sb_2O_3$, $ZrO_2$, $WO_3$, $Pr_6O_{11}$, CdSe, CdTe, Ge, $HfO_2$, PbTe, Si, Te, TlCl, and ZnTe.

10. A transparent reflection-type hologram transfer sheet comprising, in order, a support, a transparent reflection-type hologram and an adhesive layer formed on one side of the support;
said transparent reflection-type hologram comprising a transparent hologram-forming layer including a relief-hologram forming surface, and a holographic effect-enhancing layer comprising a thin transparent film, said holographic effect-enhancing layer having having a refractive index $n_2$ different from a refractive index $n_1$ of said transparent hologram-forming layer and being formed on the relief-hologram forming surface of the transparent hologram-forming layer, the difference between the refractive index $n_1$ and the refractive index $n_2$ being more than 0.2.

11. A transfer sheet as claimed in claim 10, wherein said holographic effect-enhancing layer has a refractive index different from that of the transparent hologram-forming layer.

12. A transfer sheet as claimed in claim 10, wherein $n_2 - n_1 \geq 1.0$.

13. A transfer sheet as claimed in claim 10, wherein a releasing layer is disposed between said support and said transparent reflection-type hologram.

14. A transfer sheet as claimed in claim 13, wherein a protective layer is further disposed between said releasing layer and said transparent reflection-type hologram 15. A transfer sheet as claimed in claim 14, wherein a printed layer is formed between and/or on said layers.

16. A transfer sheet as claimed in claim 14, wherein at least one of said layers is colored.

17. A transfer sheet as claimed in claim 10, wherein a fragile layer is disposed between said transparent reflection-type hologram and said adhesive layer.

18. A transfer sheet as claimed in claim 10, wherein said transparent reflection-type hologram has a printed layer.

19. A transfer sheet as claimed in claim 10, wherein said transparent reflection-type hologram is colored.

20. A transfer sheet as claimed in claim 10, wherein said holographic effect-enhancing layer comprises a thin metal film of a thickness not exceeding 200 Å.

21. A transfer sheet as claimed in claim 10, wherein said holographic effect-enhancing layer is disposed on at least a part of said transparent hologram-forming layer.

22. A transfer sheet as claimed in claim 10, wherein a relief hologram is formed on at least a part of said transparent hologram-forming layer.

23. A transparent reflection-type hologram sheet comprising a releasing layer, a transparent reflection-type hologram laminated on one surface thereof, and an adhesive layer disposed between said releasing layer and said transparent reflection-type hologram;
said transparent reflection-type hologram comprising a transparent hologram-forming layer including a relief-hologram forming surface, and a holographic effect-enhancing layer comprising a thin transparent film, said holographic effect-enhancing layer having a refractive index $n_2$ different from a refractive index $n_1$ of said transparent hologram-forming layer and being formed on the relief-hologram forming surface of the transparent hologram-forming layer, the difference between the refractive index $n_1$ and the refractive index $n_2$ being more than 0.2.

24. A sheet as claimed in claim 23, wherein $n_2 - n_1 \geq 1.0$.

25. A sheet as claimed in claim 23, wherein a protective layer for protecting the surface of a hologram is disposed on a surface of said transparent hologram-forming layer.

26. A sheet as claimed in claim 23, wherein a fragile layer is disposed between said transparent reflection-type hologram and said adhesive layer.

27. A sheet as claimed in claim 23, wherein said transparent reflection-type hologram has a printed layer.

28. A sheet as claimed in claim 23, wherein said transparent-type hologram is colored.

29. A sheet as claimed in claim 23, wherein said holographic effect-enhancing layer comprises a thin metal film of a thickness not exceeding 200 Å.

30. A sheet as claimed in claim 23, wherein a printed layer is formed between said layers.

31. A sheet as claimed in claim 23, wherein at least one of said respective layers is colored.

32. A sheet as claimed in claim 23, wherein said holographic effect-enhancing layer is disposed on at least a part of said transparent hologram-forming layer.

33. A sheet as claimed in claim 23, wherein a hologram is formed on at least a part of said transparent hologram-forming layer.

34. A transparent reflection-type hologram article comprising a transparent reflection-type hologram formed on the surface or internally of a substrate;
said transparent reflection-type hologram comprising a transparent hologram-forming layer including a relief-hologram forming surface, and a holographic effect-enhancing layer comprising a thin transparent film, said holographic effect-enhancing layer having a refractive index $n_2$ different from a refractive index $n_1$ of said transparent hologram-forming layer and being formed on the relief-hologram forming surface of the transparent hologram-forming layer, the difference between the refractive index $n_1$ and the refractive index $n_2$ being more than 0.2.

35. An article as claimed in claim 34, wherein $n_2 - n_1 \geq 1.0$.

36. An article as claimed in claim 34, wherein said holographic effect-enhancing layer comprises a thin metal film of a thickness not exceeding 200 Å.

37. An article as claimed in claim 34, wherein said holographic effect-enhancing layer is disposed on at least a part of said transparent hologram-forming layer.

38. An article as claimed in claim 34, wherein a printed layer is formed on the surface of and/or inside said transparent hologram-forming layer and/or said holographic effect-enhancing layer.

39. An article as claimed in claim 34, wherein at least one of said transparent hologram-forming layer and holographic effect-enhancing layer is colored.

40. An article as claimed in claim 34, wherein said hologram-forming layer forms the substrate.

41. A sheet as claimed in claim 34, further comprising a base sheet laminated on the surface of said transparent hologram-forming layer.

42. A sheet as claimed in claim 41, wherein a printed layer is formed between and/or on said layers.

43. A sheet as claimed in claim 41, wherein at least one of said layers is colored.

* * * * *